United States Patent [19]

Harrison

[11] Patent Number: 4,921,753

[45] Date of Patent: May 1, 1990

[54] COMPOSITE ARTICLE WITH THERMODYNAMICALLY UNSTABLE COATING

[75] Inventor: Bruce Harrison, St. Louis, Mo.

[73] Assignee: United Technologies Automotive Inc., Dearborn, Mich.

[21] Appl. No.: 105,748

[22] Filed: Oct. 8, 1987

[51] Int. Cl.[5] ............................................. B32B 7/00
[52] U.S. Cl. ................................... 428/251; 428/252; 428/253; 428/416; 428/418; 428/462
[58] Field of Search .............. 428/251, 252, 246, 253, 428/416, 418, 462

[56] References Cited

U.S. PATENT DOCUMENTS 4,308,308 12/1981 Sachse ................................ 428/168

Primary Examiner—Marion C. McCamish

[57] ABSTRACT

The invention discloses a metal stiffener composite article comprising a reinforcing resin solution of an elastomer, a thermosetting resin and a thermosetting resin curing agent formed into strips and contacted with a porous reinforcing layer. The reinforcing resin solution being thermodynamically unstable such that a thermosetting rich phase separates from the solution and forms a layer upon the surface of the solution impregnating the porous reinforcing layer.

12 Claims, 1 Drawing Sheet

COMPOSITE ARTICLE WITH THERMODYNAMICALLY UNSTABLE COATING

DESCRIPTION

TECHNICAL FIELD

The technical field to which this invention pertains is composite articles and particularly composite articles useful as reinforcement.

BACKGROUND ART

As gasoline prices began to increase as well as the cost of materials to manufacture automobiles, the amount of metal used in such manufacture was reduced. This was accomplished in two parallel efforts. The first by replacing metal components with lighter weight and less expensive plastic ones and secondly by using ever thinner metal sheeting.

Although this allowed the manufacturers to produce lighter and cheaper cars, the thin metal components required reinforcing to prevent inadvertent denting or collapse of the component.

Therefore, what is needed in this art is a lightweight, durable, nonbrittle reinforcement which is easy to use.

BRIEF DISCLOSURE OF THE INVENTION

The present invention discloses a composite article useful as a metal stiffener comprising a layer of a reinforcing matrix itself comprising of an elastomer, thermosetting resin and a curing agent for the thermosetting resin, wherein the elastomer is only partially soluble in the thermosetting resin resulting in a thermodynamically unstable solution and said reinforcing material is in contact with a porous reinforcing layer.

Additionally, disclosed herein are methods for making said composite article and for using said composite article.

Other features and advantages will be apparent from the specification and claims and from the accompanying drawings which illustrate an embodiment of the invention.

BEST MODE FOR CARRYING OUT THE INVENTION

Figure 1:
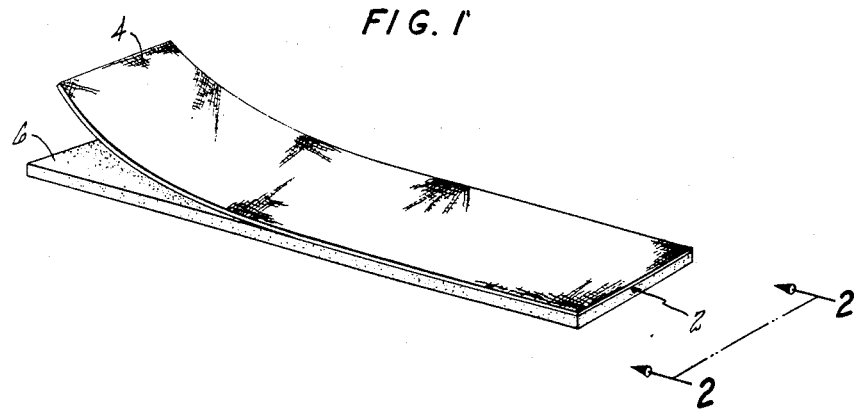
FIG. 1 is a perspective view of one embodiment of the present invention.

The elastomers useful in practicing this invention may be any elastomer which will be compatible with the thermosetting resin employed such that at the desired level of concentration, the elastomer is not completely soluble in the thermosetting resin. The particular elastomer chosen for a specific thermosetting resin may depend on the temperature limitation required for the composite article, or other physical properties of the composite. For instance, the use of certain elastomers will result in a more compliant, less stiff composite after the thermosetting resin has been cured.

However, the principal selection parameter for the elastomer will be its solubility in the thermosetting resin selected.

Since the resulting reinforcing composition requires that the elastomer be substantially homogenously mixed with the thermosetting resin prior to its application to the porous reinforcing layer yet is dynamically unstable such that the thermosetting resin will form a separate phase on the surface of the reinforcing composition over time, the solubilities of these two constituents is important. The separation often appears as droplets of substantially pure thermosetting resin (it appears to have "oozed" or "sweated" out of the reinforcing matrix).

Although any number of elastomeric resins could be used, typical elastomers such as styrene butadiene rubber (SBR), blocked copolymers of styrene butadiene (i.e. Krayton 1101, Steron 700 or Solprene 1205), Synpol 1009 or Synpol 1006 are especially well suited with the styrene blocked copolymers known as Kraytons being especially preferred with Krayton 1101 a styrene butadiene styrene block copolymer being the most preferred.

The selection of a particular elastomeric resin, which would be only partially soluble in the thermosetting resin, would be known to those skilled in the art. Typically, the elastomer resin will be present at concentrations less than that of the thermosetting resin and typically will be present in concentrations of thermosetting resin of about 90 parts per hundred rubber (phr) to about 200 phr and preferably from about 75 phr to about 175 phr.

The thermosetting resins useful for this invention, like the elastomer resin must be compatible with the elastomer and the environment it must perform in (cure at acceptable temperatures and be thermally stable throughout the anticipated temperature range of use for the composite).

Typical thermosetting resins which may be used are the methacrylates, such as TMPTMA, Sartomer-SR348, TMTA, or Sartomer SR231; the polyesters such as the Coppers series 1063-1 to Coppers 1063-5; or epoxies such as EPON 828, Ciba Geigy 2010, or Perry BE-188. The selection of which thermosetting resin to use will depend on its solubility with the selected elastomer, and this would be known to those skilled in the art or determinable through simple experimentation. The amount of thermosetting resin used will vary depending on its ability to solubilize the elastomer and form a sufficiently, thermodynamically, unstable solution to permit the composite article to work properly.

The porous reinforcing layer upon which a the reinforcing solution is placed is typically a thin sheet having sufficient porosity to allow the thermosetting resin-rich phase to penetrate into and around the layer. Many comparable reinforcing layers may be used such as dacron, nylon or glass fiber cloths which have been woven or knitted. Other materials may also be used such as Kevlar or carbon fiber composites. However, glass fiber cloths are preferred.

These reinforcing layers are typically thin, compliant sheets and generally will have thicknesses ranging from about 20 to about 50 mils. The substrates may additionally be formed from solid sheets or films of material which have sufficient porosity to allow the thermosetting resin to penetrate or impregnate into the layer sufficiently to form a unitary, strong structure when the resin is cured.

Conventional curing agents are added to the solution to effectively cure the epoxy or cross link the polyesters or methacrylates at the desired temperature. The amount of the curing agent and its selection will be a function of the amount and type of thermosetting resin used.

Preferably latent cure systems should be used to add greater shelf life to the product. Some preferred materials for the epoxies would be boron trichloride, dicyanamide or boron trifluoride while conventional peroxide curing systems may be employed with the polyester resins and methacrylates.

The manufacture of articles of this invention uses conventional techniques and processing.

Typically the elastomer and the thermosetting resin, as well as the thermosetting resin curing agent, are thoroughly mixed in a Banbury mixer or similar device to form a macro-molecular, homogenous solution which is thermodynamically unstable and will, over time, separate into a thermosetting rich phase on the surface of an elastomeric, resin-rich core.

Referring now to FIG. 1, the resulting solution is then formed into a thin strip 6, typically about 50 mils to about 80 mils. This may be done using any conventional technique. However, the preferred method is to extrude the solution into the desired thickness. The surface of the resulting strip is then contacted, under sufficient pressure, to the porous reinforcing layer 4, causing the bonding of the two components together forming an uncured but unitary structure 2.

Figure 2:
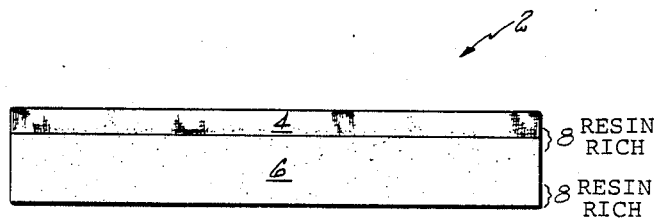
FIG. 2 is an enlarged view taken along line 2—2 of FIG. 1.

Subsequent to the formation of the article (referring to FIG. 2) the reinforcing solution will, (over time) develop a thermosetting resin-rich phase 8 on its surface which will impregnate the porous reinforcing layer 4. Some of the thermosetting rich material will also seperate out onto the opposite surface of the strip not in contact with the reinforcing layer and act as a bonding agent when placed in contact with the metal component to be reinforced. Of course, a second reinforcing strip (not shown) could also be placed onto the other surface of the reinforcing layer so that both the stiffener could be positioned between two metal components and bonded thereto to form a stiffened metal sandwich. Naturally the resulting resin-rich phase will contain some elastomer, however, it will contain significantly less than when the solution was homogenous.

The length of time required for sufficient thermosetting resin-rich phase to separate and impregnate the porous reinforcing layer will vary according to the dynamics or instability of the solution. However, a desirable time period which would be economically practical would be about 2 to about 3 days.

The resulting article has a number of advantages for use as a metal stiffener. First, the unitary design makes the positioning of the article onto the end product by the end user very simple. Typically, there is no need for extra adhesives as the epoxy acts as the bonding agent.

Secondly, the resulting cured composite article offers improved fracture toughness due to the introduction of the elastomer resin into the thermosetting resin. This will improve the life of the stiffener to withstand repeated blows without shattering or losing its stiffness.

Thirdly, the process of formation of the composite article results in a unique monolithic reinforcement material which results in improved integrity of the cured article.

It should be understood that the invention is not limited to the particular embodiments shown and described herein, but that various changes and modifications may be made without departing from the spirit and scope of this novel concept as defined by the following claims.

I claim:

1. A composite article comprising a layer of reinforcing material having opposing first and second surfaces, said first surface in contact with a porous reinforcing layer wherein the reinforcing material comprises a thermodynamically unstable solution of an elastomer, a thermosetting resin and a curing agent for said thermosetting resin wherein said thermodynamically unstable solution has formed thermosetting resin rich layers on said first surface and second surfaces.

2. The composite article of claim 1 wherein said thermosetting resin rich layer impregnates the porous reinforcing layer.

3. A composite article comprising a layer of reinforcing material between and in contact with porous reinforcing layers wherein the reinforcing material comprises a thermodynamically unstable solution of an elastomer, thermosetting resin and a curing agent for said thermosetting resin wherein said thermodynamically unstable solution has formed thermosetting resin rich layers on the surfaces of the reinforcing material in contact with said porous reinforcing layers.

4. The composite article of claim 3 wherein said thermosetting resin rich layer impregnates the porous reinforcing layers.

5. The composite article of claims 1 or 3 wherein the thermosetting resin is an epoxy and the elastomer is styrene butadiene styrene block polymer.

6. The composite article of claims 1 or 3 wherein the porous reinforcing substrate is a woven glass fiber mat.

7. The composite article of claims 1 or 3 wherein the reinforcing composition comprises a thermosetting resin in concentration of about 90 to about 200 parts per hundred of the elastomer.

8. A method of making a composite article comprising:
   forming a thermodynamically unstable solution of an elastomer, a thermosetting resin and a curing agent for said thermosetting resin,
   forming said solution into an elongate strip having first and second opposing surfaces,
   contacting said elongate strip to a porous reinforcing layer with sufficient pressure to cause said strip to adhere to said reinforcing layer, wherein said thermodynamically unstable solution undergoes separation to form a thermosetting resin rich phase on each surface of the solution and penetrates the porous reinforcing layer.

9. The method of claim 8 wherein the thermosetting resin is an epoxy.

10. The method of claim 9 wherein the thermosetting resin is present as a majority constituent by weight in the solution.

11. The method of claim 8 wherein the reinforcing layer is a glass fiber mat.

12. The method of claim 8 wherein the elastomer is styrene butadiene styrene block polymer.

* * * * *